No. 622,559. Patented Apr. 4, 1899.
McELMER STEWART.
HORSESHOE.
(Application filed May 28, 1898.)
(No Model.)

Witnesses:
M. R. Remley.
F. S. Thrasher.

Inventor:
McElmer Stewart
By Higdon, Fischer & Thorpe
Attys.

UNITED STATES PATENT OFFICE.

McELMER STEWART, OF KANSAS CITY, MISSOURI, ASSIGNOR OF ONE-HALF TO JOHN T. WELLINGTON, OF SAME PLACE.

HORSESHOE.

SPECIFICATION forming part of Letters Patent No. 622,559, dated April 4, 1899.

Application filed May 28, 1898. Serial No. 682,084. (No model.)

*To all whom it may concern:*

Be it known that I, McELMER STEWART, of Kansas City, Jackson county, Missouri, have invented certain new and useful Improvements in Horseshoes, of which the following is a specification.

My invention relates to horseshoes, and more especially to that class of horseshoes provided with sound-deadening pads or cushions; and the invention consists in certain novel and peculiar features of construction and combinations of parts, as will be hereinafter described and claimed.

The object of the invention is to produce a shoe of the character above mentioned possessing wear pads or cushions which when sufficiently worn to render it desirable may be replaced by new ones at small cost.

A further object is to produce a shoe of this character which is of simple and inexpensive construction and can be fitted to the hoof of an animal with the same ease and despatch that an ordinary shoe is secured in place.

Other objects of the invention will hereinafter appear, and in order that it may be fully understood I will proceed to describe it with reference to the accompanying drawings, in which—

Figure 1:
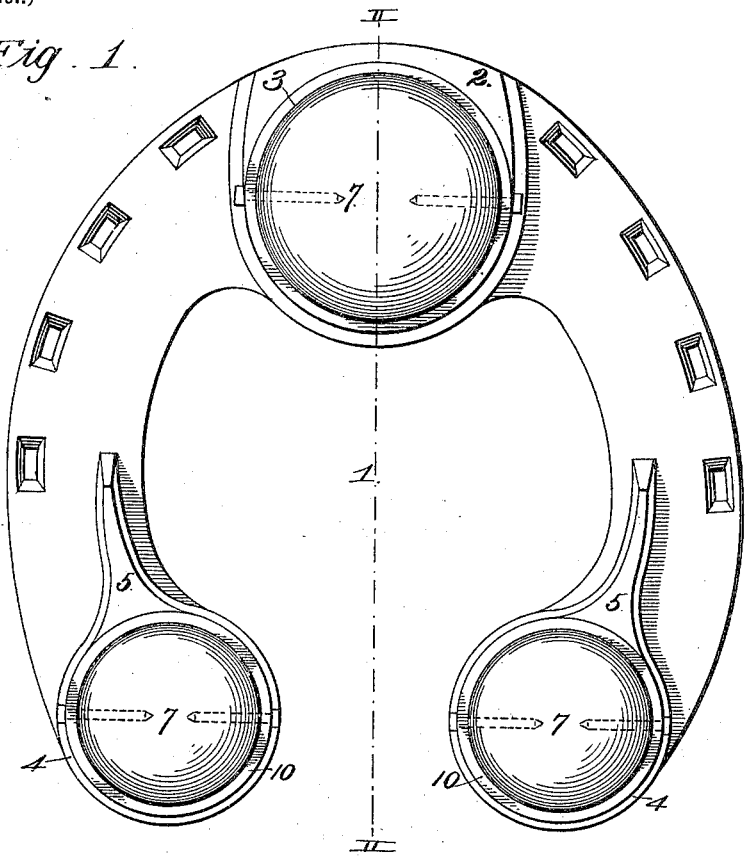
Figure 2:
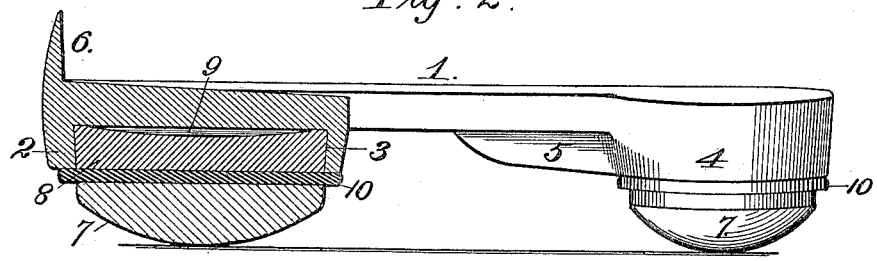
Figure 3:
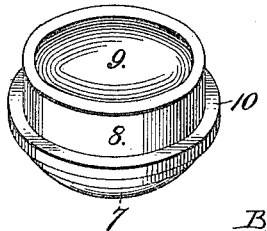

Figure 1 represents an inverted plan view of a horseshoe embodying my invention. Fig. 2 represents a section taken on the line II II of Fig. 1. Fig. 3 represents a perspective view, detached, of one of the sound-deadening pads or cushions.

In the said drawings, 1 designates a horseshoe of the usual or any preferred material and general contour, and said shoe is provided at its front end with the depending and substantially circular enlargement 2, provided with a circular socket 3, the upright wall of which converges downwardly, as shown clearly in Fig. 2, for a purpose which will hereinafter appear. 4 designates similar circular enlargements depending from the rear or "heel" ends of the shoe, and said enlargements are provided with circular sockets of precisely the same style as that already described. Said heel enlargements, however, are strengthened or braced by means of the ribs 5, which extend forward a suitable distance and are formed integral with the shoe, and the shoe is also provided at its front end and upper side with the upwardly-projecting lug 6, against which the hoof is secured in order that the securing-nails shall be relieved largely of lateral strain. This lug 6, however, is in common use.

The pads or cushions for the front and heel ends of the shoe are of precisely the same construction, except that the former is by preference of somewhat greater diameter than the latter. Therefore a description of one will suffice for all. Said pad or cushion by preference consists of a combination of sole-leather or its equivalent and rubber or its equivalent, the former being designed for direct contact with the ground and the shoe, as it possesses good wearing properties, while the latter is designed to act as a cushion for the former, so as to relieve it largely of the shock or jar which accompanies each step of the animal, which shock or jar would in a comparatively short time break or cause the disintegration of the comparatively hard leather unless it was cushioned in some manner. Said pad consists, preferably, of the lower member or tread-surface 7, of leather or its equivalent, the upper or socket member 8, of leather or its equivalent, provided with a cavity 9 in its upper side, and a disk 10, of rubber or its equivalent, which is interposed between the leather members and which unites the latter by means of cement, or this union may be established in any other suitable or preferred manner. The disk 8, of resilient or elastic material, is preferably of greater diameter than the socket in order that it may underlap the enlargement of the shoe and by pressure against the latter still further relieve the wear-surfaces of the pad, as will be readily seen. To position said pad properly in one of said sockets—the socket 3, for instance—the upper leather member 8 is preferably compressed slightly and forced into the socket 3, this action at the same time tending to flatten out the upper surface of said member, and therefore exclude practically all of the air between the same and the base of the socket. When forced completely in, it is released and being permitted to expand more at its upper than at its lower margin is dovetailed in said socket. Furthermore, the vacuum created between the base of the socket and the upper end of the member 8 of the pad by suctional action assists in holding the pad reliably in position. As an additional precaution, the member 8 may be cemented in said socket by applying a coating of cement to the upright wall of the socket or, which is the same thing, to the upright wall of the member 8 before the latter is introduced into the socket, as will be readily understood. By this method of securing the pad it is absolutely impossible for it to be dislodged unless it be cut or dug out by means of a suitable tool, as will be readily understood, and this of course may be done when one pad becomes so worn that it necessary to replace it, or, again, the pad may be secured reliably in position by extending a pin (see dotted lines, Fig. 1) through the socket-wall and through the pad.

The shoe proper is practically indestructible and may be used for an indefinite length of time, and this feature also, it will be observed, is of peculiar advantage, owing to the fact that it is unnecessary to repeatedly puncture the animal's hoof by nailing a succession of shoes thereon.

The heel-pads, which are of precisely the same construction as above stated, are also secured in position in the manner described. When in use, the disk 10 bears against the lower end of the socket-wall.

It will thus be seen that I have produced a horseshoe which renders the travel of the horse practically noiseless, which is comfortable to and easy on the hoof, and which embodies also the advantageous features enumerated in the statement of invention, and it is to be understood that I reserve the right to make such changes in the detail construction, arrangement, form, or proportion of the parts as properly fall within the spirit and scope of my invention.

Having thus described the invention, what I claim as new, and desire to secure by Letters Patent, is—

A horseshoe, provided with a socket at its under side, and a pad secured therein, and comprising an upper member fitting in the socket, a lower or tread-surface member, and a resilient or cushion member interposed between the first-named members, and also bearing against the lower end of the socket-wall, substantially as shown and described.

In testimony whereof I affix my signature in the presence of two witnesses.

McELMER STEWART.

Witnesses:
M. R. REMLEY,
F. S. THRASHER.